July 9, 1935.                G. R. ERICSON                2,007,753
                           FILTERING MATERIAL
                          Filed May 11, 1932

GEORGE R. ERICSON
        INVENTOR

BY  J. H. Gibbs
        ATTORNEY

Patented July 9, 1935

2,007,753

UNITED STATES PATENT OFFICE 2,007,753

FILTERING MATERIAL

George R. Ericson, Maplewood, Mo., assignor to Carter Carburetor Corporation, St. Louis, Mo., a corporation of Delaware Application May 11, 1932, Serial No. 610,582

6 Claims. (Cl. 210—204)

It will be understood that the invention is susceptible of many modifications, and, accordingly, I do not wish to be limited in my protection, except as set forth in the accompanying claims.

This invention relates to improvements in filtering materials, and more specifically to materials for filtering oils which have become contaminated from use in internal combustion engines.

Many materials have been suggested for filtering used engine oil, but prior to this invention, it has been impossible to produce a material having a fine enough texture to remove the solid matter from the oil without reducing the capacity to such a point as to make the filter impractical for automotive use. Attempts have been made to use paper filters, but there is invariably some dampness in oil which has been used in an internal combustion engine, and papers which might be otherwise suitable are so softened by the moisture in the oil as to render them useless within a very short period. Even with dry oils, the paper filters soon become soft enough to permit the fibres to mat down and fill up the passageways through which the oil should flow.

It is an object of this invention to provide a filtering material of the fibrous sheet or paper type which will be unaffected by water or oil and which will have sufficient stiffness in the fibres to resist matting down and clogging of the filter.

Further objects of this invention will appear from the following description and accompanying drawing, referring to which:

Figure 1:
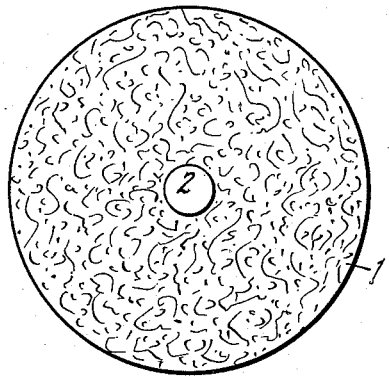
Figure 1 is a plan view of a sheet of filtering paper constructed according to my invention.
Figure 2:
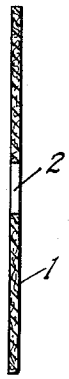
Figure 2 is a cross sectional view of the sheet shown in Figure 1.
Figure 3:
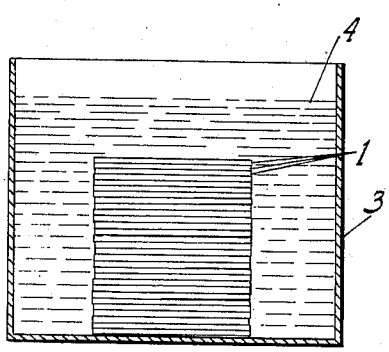
Figure 3 shows a dipping tank for treating filter paper.
Figure 4:
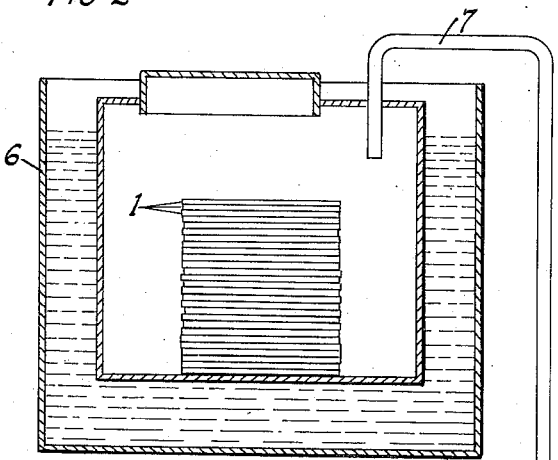
Figure 4 shows a diagram of apparatus for reclaiming the solvent from the filter treating material.
Figure 4:
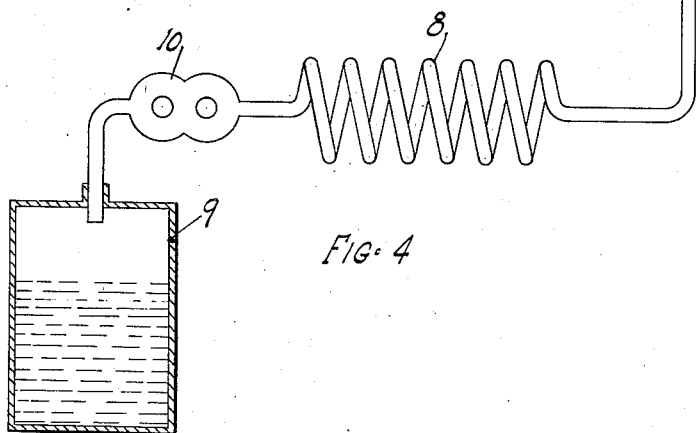

The reference numeral 1 indicates a sheet of filtering material having an opening 2 therein. This material is ordinary commercial filter paper, preferably of cotton or woven fibre, and treated in a manner hereinafter to be described. It may be stated that the particular shape into which the material is cut has no relation to this invention, but the annular shape shown in Figures 1 and 2 is suitable for use in a certain specific type of filter construction which I have shown and claimed in my co-pending application Serial No. 595,300, filed February 26, 1932.

The reference numeral 3 indicates a tank containing the treating liquid 4 which is preferably formed by taking ordinary commercial cellulose or pyroxylin brushing lacquer of suitable consistency for application with a brush and as sold commercially and then adding large quantities of a suitable volatile solvent.

|  | Per cent |
|---|---|
| Ordinary commercial brushing or spraying lacquer | 5 to 15 |
| Amyl acetate or similar volatile solvent | 85 to 95 |

I first cut the filter paper to shapes and sizes suitable for use, to avoid wastage of the lacquer on paper which is not to be used. I then dip stacks of the filter paper in the tank 3 containing the solution and permit the paper to soak up as much of the lacquer as it will hold. I then place the stacks of soaked paper in a closed receptacle 5 provided with a hot water jacket 6, a steam coil or other heating means to evaporate the solvent. The receptacle is provided with an outlet conduit 7 which is passed through any suitable cooling means 8 and led into a container 9. A suction pump 10 is preferably provided for the purpose of lowering the boiling point of the solvent so that it may be completely evaporated without raising the temperature to an injurious degree.

In this manner, the amyl acetate or other thinner or solvent may be practically all reclaimed. After the filter paper is dried in the closed receptacle, it is ready for use. It may be noted that the solution of lacquer is so thin that the sheets of filter paper do not stick together when dried in a stack, and no special means for separating the sheets need be provided.

By this process, the fibres of the filter paper are so thoroughly permeated with the lacquer as to be entirely impervious to oil or water, and mixtures of oil and water may be passed through the filter without softening or otherwise damaging the filter element at all.

While the strength of the lacquer solution is insufficient to cause two adjacent sheets of paper to stick together, a slight sticking-together of the fibres is caused, so that the tensile strength of the paper is greatly increased, and the filter can be operated at higher pressures without danger of ruptures in the filter element.

The above described treatment for filtering materials gives a definite increase of stiffness and resiliency thereto. The additional stiffness makes it possible to use a larger mesh in the supporting material, that is to say, larger areas of the filtering material may be exposed to a given pressure without support.

The resiliency of this filtering material permits it to swell out into the meshes of the supporting material under pressure, and when the pressure is relieved, the paper will straighten out and return to its original shape. This has a definitely beneficial effect in prolonging the life of a filter, because the slime bed is broken up by the repeated flexing and the rate of filtration does not drop as rapidly, while the thickness of the slime bed is increased, as would be the case with a non-resilient type of filtering material.

I claim:

1. A filtering material comprising a sheet of paper, said sheet having been soaked in a thin solution of lacquer and dried, the consistency of the lacquer solution being such that the interstices between the fibers are open and substantially unobstructed after drying.

2. The method of preparing a filtering material which comprises forming a sheet of rag paper, dipping said sheet in a solution of lacquer consisting of not more than fifteen percent lacquer and not less than eighty-five percent thinner, and drying said sheet.

3. The method of preparing a filtering material which comprises forming a sheet of porous paper, forming a solution of ordinary commercial brushing lacquer and lacquer thinner, the volume of thinner used being greater than the volume of brushing lacquer, dipping said sheet in said solution, and drying the sheet.

4. The method of forming a filtering material which comprises forming a sheet of porous paper, forming a solution of approximately ten per cent commercial brushing lacquer and ninety per cent thinner, dipping the sheet into the lacquer, and drying the sheet.

5. The method of preparing filtering materials which comprises forming a solution of a small proportion of ordinary commercial brushing lacquer and a larger proportion thinning fluid, dipping the material in the solution, evaporating the thinner from the lacquer in a closed receptacle, condensing the vapors, and thereby reclaiming the thinning fluid.

6. The method of treating filtering materials which comprises forming a sheet of filter paper, forming a solution of approximately ten per cent brushing lacquer and ninety per cent amyl acetate or the like, dipping the said filter paper in said solution, placing said paper in a closed receptacle, evaporating said amyl acetate from said paper, recondensing the vapors, and reclaiming said amyl acetate.

GEORGE R. ERICSON.